3,189,583
PREPARATION OF VINYL AROMATIC ESTER HOMOPOLYMERS AND COPOLYMERS, INCORPORATING A PRE-POLYMERIZATION HOMOGENIZATION STEP
Lowell E. McCaw, Rochester, N.Y., and Ellsworth C. McClenachan, Stamford, Conn., assignors to American Cyanamid Company, Stamford, Conn., a corporation of Maine
No Drawing. Filed Apr. 6, 1962, Ser. No. 185,526
5 Claims. (Cl. 260—86.1)

This invention relates to the preparation of high molecular weight polymeric materials. More particularly, this invention relates to a novel method of polymerizing various aromatic ester monomers with the production of a soluble polymer in high conversion. Still more particularly, this invention relates to a novel method of polymerizing aromatic ester monomers represented by the formula (I)

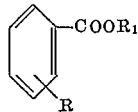

wherein R is a substituent selected from the group consisting of hydrogen and an alkyl radical having from about 1 to 8 carbon atoms, inclusive, and $R_1$ is an aliphatic radical containing one olefinic double bond and having from about 2 to 8 carbon atoms, inclusive, wherein the polymer produced is soluble in common organic solvents, has a high molecular weight and is recovered in relatively high yields. Still more particularly, the present invention relates to a novel method of copolymerizing aromatic ester monomers, represented by Formula I above, with various monoethylenically unsaturated comonomers, wherein the copolymer contains at least about 75% of the combined aromatic ester and wherein the copolymer is soluble in common organic solvents, has a high molecular weight and is recovered in high yields.

Previous to our invention, the prior art methods for the emulsion polymerization of aromatic esters were extremely inadequate and commercially unattractive. The polymers produced by said processes were, for the most part, highly cross-linked and, as such, were insoluble in common inorganic solvents. These polymers, in the insoluble state, were therefore not useful for such purposes as coatings, films, moldings and the like, where solvent evaporation is essential. Previously, casting was the only useful procedure and this was usually insufficient in regard to the characteristics of the film etc. produced. Soluble polymers could sometimes be produced utilizing these prior art methods, however, the conversion was so low, i.e. below about 20%, that the cost made the methods prohibitive. In summary, the emulsion polymerization processes of the prior art for the polymerization of aromatic esters presented two major problems. When the conversion was high, the polymers produced were insoluble in ordinary solvents. When the polymers produced were soluble, the conversion was low. Additionally, another problem, although of a somewhat less critical nature, was the fact that the soluble polymers which were produced had very low molecular weights. This, additionally, detracted from the usefulness of the polymer in that the products produced therefrom did not possess adequate resistance to heat, chemicals, wear and the like.

We have found a novel emulsion polymerization process wherein high molecular weight, soluble polymers may be produced in relatively high yields. Our process includes the novel feature of pretreating a mixture of an emulsifier, water and an aromatic ester by homogenizing the mixture prior to subjecting it to polymerization. We have found that this homogenization, coupled with the incorporation of other critical conditions during the polymerization per se, enables the production of high molecular weight polymers, having a high degree of solubility in common organic solvents. Additionally, our process enables the production of these soluble, high molecular weight polymers, in yields of at least about 85%, affording a process which is very efficient and commercially attractive.

It is an object of the present invention to provide a novel method for the production of high molecular weight, soluble polymers of aromatic esters.

It is a further object of the present invention to provide a novel process wherein high yields of high molecular weight, soluble polymers of aromatic esters may be produced.

It is a further object of the present invention to provide an emulsion polymerization process wherein aromatic esters may be polymerized to give a high yield of non-cross-linked, soluble, high molecular weight polymers.

According to the method of the present invention, we have discovered that it is possible to obtain high molecular weight, soluble polymers of aromatic esters in high yields, utilizing an emulsion polymerization process, by first homogenizing an emulsifier-water-monomer mixture and then polymerizing the homogenized blend under various critical conditions. The homogenization may be conducted in any known manner, such as with a colloidal homogenizer, i.e. colloid mill, a creamery homogenizer, a rapid-agitation blender and the like, to form an homogenized mixture which is unusually uniform. The homogenization is continued for that period of time necessary to form a stable homogenized solution, i.e., generally from 15 to 30 minutes. In this condition, the homogenized mixture is heated to the desired reaction temperature. The catalysts are then added to the heated homogenized mixture and the system is continually agitated until the polymer is formed. The emulsion is then broken and the polymer is recovered by any known procedure.

Specifically, the homogenized emulsion or mixture is produced utilizing any anionic emulsifier, such as, for example, dihexyl sodium sulfosuccinate, dioctyl sodium sulfosuccinate, disodium n-octadecyl n-disodium carboxyethyl sulfosuccinate, and the like, in concentrations of from about 1.0% to about 6.0%, preferably 2.5% to 4.0%, based on the amount of monomers present in the mixture. The emulsifier is mixed with such a quantity of water that there is formed a solution containing from about 10% to about 30% solids, preferably 15% to 27%, of the monomers in the emulsion solution. The solution is then homogenized in the manner indicated above.

The homogenized solution is then heated, in a suitable reaction vessel, to a temperature of from about 50° C. to about 100° C., preferably 65° C. to 80° C., at atmospheric pressure. Superatmospheric or subatmospheric pressure may be used, if desired, without detracting from the advantages of the present invention. Oxygen present in the vessel, in the form of air and the like, is removed by continually passing an inert gas through the vessel during the reaction. The type of inert gas employed is not critical and any commercially available gas such as nitrogen, carbon dioxide, argon, neon, propane and the like may be used.

The catalyst is then added to the heated, homogenized emulsifier-water-monomer mixture in concentrations of from about 0.05% to 3.0%, preferably 0.1% to 1.0%, based on the weight of monomer present. We have found that a dropwise addition of the catalyst over a period of from about 30 minutes to about 90 minutes results in more uniform polymer formation, and generally, is the preferred method for adding the catalyst to the reactor.

The type of catalyst employed has been found to be somewhat critical and generally it must be one of the so-called "slow-reacting catalysts" of the redox or free-radical generating variety. Some of the redox and free-radical catalysts known in the art are not of the slow-reacting variety and therefore are not preferred in this process. By "slow-reacting catalysts" is meant those having a half-life, at the temperature of the reaction, of at least 10 minutes and generally from 10 to 30 minutes and more. A more complete description and explanation regarding the use and function of this type of catalyst may be found in "Free Radicals In Solution," C. Wolling, J. Wiley and Sons, publishers, 1959.

Catalysts which conform to this description and which are useful in the present invention include ammonium persulfate, potassium persulfate, azobisisobutyronitrile, ammonium persulfate-sodium metabisulfite mixtures, ammonium persulfate-sodium sulfite mixtures, potassium persulfate-sodium metabisulfate mixtures and the like.

The reaction is allowed to continue for a period of from about 1 to 24 hours with continuous agitation during this time, however, we have found that the polymers are generally completely produced in from about 2 to 4 hours.

As mentioned above, after the polymerization has been terminated, the emulsion may be broken by any known method, i.e. freezing the reaction mixture, precipitation of the polymer with salts, etc. The polymer is recovered by, for example, filtration. The polymer can then be washed with, for example, a solvent for the monomer, i.e. isopropanol, and dried. Additionally, it is also possible to break the emulsion by contacting the entire reaction mixture with a non-solvent for the polymer so as to precipitate the polymer. The polymer is then recovered by filtering, washing, and drying, as described above.

The polymers produced by this process are soluble in common organic solvents such as, for example, benzene, toluene, tetrahydrofuran, dimethyl formamide, methyl isobutyl ketone, carbon tetrachloride, and the like. The polymers possess molecular weights generally in excess of 50,000 and preferably between about 100,000 and 200,000. The average molecular weight may be determined by intrinsic viscosities and by the light scattering method. (See P. J. Flory, Principles of Polymer Chemistry, Cornell University Press, 1953, 266–316.) The percent conversion of our novel system ranges from about 75% to 100% and generally the conversion is at least 90%. The polymers are very tough and brittle and are water-white in appearance.

These soluble polymers find general application in such fields as surface coating, films, moldings, binders and the like where advantage may be taken of their clarity, alkali and acid resistance, high refractive index, low level of plasticization requirement, excellent pigment dispersion and flow properties and good adhesion to most substrates.

The aromatic esters represented by Formula I, above, are those which may be polymerized to soluble polymers by the novel process of the instant invention. Compounds which are represented by said formula include vinyl benzoate, vinyl o, m, and p-toluate, vinyl o, m, and p-ethylbenzoate, vinyl o, m, and p-propylbenzoate, vinyl o, m, and p-butylbenzoate, vinyl o, m, and p-amylbenzoate, vinyl o, m, and p-hexylbenzoate, vinyl o, m, and p-heptylbenzoate, vinyl o, m, and p-octylbenzoate, allyl benzoate, allyl o, m, and p-toluate, allyl o, m, and p-ethylbenzoate, allyl o, m, and p-propylbenzoate, allyl o, m, and p-butylbenzoate, allyl o, m, and p-amylbenzoate, allyl o, m, and p-hexylbenzoate, allyl o, m, and p-heptylbenzoate, allyl o, m, and p-octylbenzoate, methallyl benzoate, methallyl o, m, and p-toluate, methallyl o, m, and p-ethylbenzoate, methallyl o, m, and p-propylbenzoate, methallyl o, m, and p-butylbenzoate, methallyl o, m, and p-amyl benzoate, methallyl o, m, and p-hexylbenzoate, methallyl o, m, and p-heptylbenzoate, methallyl o, m, and p-octylbenzoate, isopropenyl benzoate, isopropenyl o, m, and p-toluate, isopropenyl o, m, and p-ethylbenzoate, isopropenyl o, m, and p-propyl benzoate, isopropenyl o, m, and p-butylbenzoate, isopropenyl o, m, and p-amylbenzoate, isopropenyl o, m, and p-hexylbenzoate, isopropenyl o, m, and p-heptyl benzoate, isopropenyl o, m, and p-octylbenzoate, crotyl benzoate, crotyl o, m, and p-toluate, crotyl o, m, and p-ethylbenzoate, crotyl o, m, and p-propylbenzoate, crotyl o, m, and p-butylbenzoate, crotyl o, m, and p-amylbenzoate, crotyl o, m, and p-hexylbenzoate, crotyl o, m, and p-heptylbenzoate, crotyl o, m, and p-octylbenzoate, ethallyl benzoate, ethallyl o, m, and p-toluate, ethallyl o, m, and p-ethylbenzoate, ethallyl o, m, and p-propylbenzoate, ethallyl o, m, and p-butylbenzoate, ethallyl o, m, and p-amylbenzoate, ethallyl o, m, and p-hexylbenzoate, ethallyl o, m, and p-heptylbenzoate, ethallyl o, m, and p-octylbenzoate and the like.

Additionally, copolymers can be produced by our process utilizing one or a mixture of the compounds mentioned above in combination with various monoethylenically unsaturated monomers, wherein the combined aromatic ester content of the copolymer is at least about 75%.

Examples of monomers which can be copolymerized with the monomers represented by Formula I, and which can be polymerized either singly or in a plurality (two, three, four or any desired number), the latter often being desirable in order to improve the compatability and copolymerization characteristics of the mixture of monomers and to obtain copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various polysubstituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; various acrylates, e.g., ethyl acrylate, n-butyl acrylate, methyl methacrylate, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if need in order to improve the compatibility and copolymerization characteristics of the mixed monomers.

More specific examples of allyl compounds that can be copolymerized with the compounds of Formula I are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, and other compounds, e.g., the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides and the acrylates, e.g., methyl methacrylate. Other monomers copolymerizable with the monomers of Formula I are given, for instance, in U.S. Patent No. 2,601,572, dated June 24, 1952, where examples are given both by classes and species.

The following examples are set forth for purposes of illustration only and are not to be construed as limitations on the present invention except as set forth in the appended claims. All parts and percentages are by weight unless otherwise indicated.

EXAMPLE 1

To a creamery homogenizer are added 100 parts of vinyl o-toluate, 3.9 parts of dihexyl sodium sulfosuccinate and 250 parts of water. This mixture is then prehomogenized by passing it three times through a creamery homogenizer (Economy Creamer, National, 600 North Albany Avenue, Chicago, Illinois), and charged into a suitable reaction vessel equipped with stirrer, thermometer, inert gas inlet, reflux condenser and heating device. The homogenized solution is heated to a temperature of 75° C. while nitrogen gas is charged into the vessel. To this solution is then added, dropwise, a solution of 0.45 part of ammonium persulfate and 0.09 part of sodium metabisulfite over a period of 1 hour. The reaction is allowed to continue for 8 hours, with continuous agitation, after which the emulsion is broken by reducing the temperature to −70° C. The polymer is recovered by filtration, dried and dissolved in benzene. The polymer is then reprecipitated into isopropanol and recovered in a yield of 92%. The polymer has a molecular weight of 92,000 and is soluble in benzene, toluene, tetrahydrofuran, dimethyl formamide and carbon tetrachloride.

EXAMPLE 2

101 parts of vinyl m-toluate, 4.0 parts of dioctyl sodium sulfosuccinate and 235 parts of water are added to a creamery homogenizer and homogenized for about 35 minutes. The resulting homogenized mixture is charged into a reaction vessel, equipped as in Example 1, and is heated to a temperature of 90° C. Nitrogen gas is bubbled through the vessel and to the heated solution is then added a water slurry of 0.60 part of azobisisobutyronitrile, dropwise, over a period of about one hour. The reaction is allowed to continue for 8 hours with continuous agitation. The emulsion is broken by cooling the reaction mixture to −70° C. whereby the polymer precipitates. The polymer is recovered by filtration, dried and dissolved in toluene. It is then reprecipitated from isopropanol and recovered in a yield of 75%. The polymer has a molecular weight of 93,000 and is soluble in tetrahydrofuran, acetone and benzene.

EXAMPLE 3

The procedure of Example 2 was again followed except that an equivalent amount of vinyl p-toluate was substituted for the vinyl o-toluate. Upon filtration, drying and recovery, a polymer is recovered in a yield of 74% having a molecular weight of 100,000 and soluble in benzene, dimethyl formamide and carbon tetrachloride.

EXAMPLE 4

The procedure of Example 2 was again followed except that an equivalent amount of vinyl benzoate was substituted for the vinyl o-toluate. Again a polymer having a molecular weight of 93,000 and being soluble in acetone and benzene was recovered in a yield of 75%.

EXAMPLE 5

Utilizing the procedure of Example 1 except that an equivalent amount of allyl p-toluate was substituted for the vinyl o-toluate, a polymer having a molecular weight of 130,000 and soluble in benzene, toluene, and dimethyl formamide is recovered in a yield of 88%.

EXAMPLE 6

Again utilizing the procedure of Example 1, except that crotyl p-octyl benzoate was substituted for the vinyl o-toluate in equal amounts. A polymer was recovered in a yield of 83% having a molecular weight of 97,000 and soluble in toluene, acetone and tetrahydrofuran.

EXAMPLE 7

Utilizing the procedure of Example 2 except that 87 parts of vinyl o-toluate and 13 parts of methyl methacrylate are added as the molecular charge. A copolymer having a molecular weight of 175,000, soluble in acetone and benzene, is recovered in a yield of 93%.

EXAMPLE 8

*Comparative*

3.9 parts of dihexyl sodium sulfosuccinate and 250 parts of water are charged into a suitable reaction vessel, equipped as in Example 1, and heated to a temperature of 75° C. Nitrogen gas is charged into the vessel and 100 parts of vinyl o-toluate, .45 part of ammonium persulfate and .09 part of sodium metabisulfite are added, dropwise, individually to the reaction vessel over a period of 1 hour. The reaction is allowed to continue for 8 hours with continuous agitation. The emulsion is broken by cooling the reaction medium to −70° C. The polymer is recovered by filtration in a yield of 85%. The polymer is extremely cross-linked and is insoluble in benzene, toluene, tetrahydrofuran, dimethyl formamide and carbon tetrachloride.

EXAMPLE 9

*Comparative*

To a suitable reaction vessel equipped as in Example 1 are added 100 parts of vinyl o-toluate, 3.9 parts of dioctyl sodium sulfosuccinate and 250 parts of water. The solution is heated to a temperature of 75° C. for 8 hours with continuous agitation while bubbling nitrogen gas through the vessel and after having added dropwise .60 part of azobisisobutyronitrile for 1 hour. The emulsion is broken and the polymer is recovered by filtration. A highly cross-linked polymer is recovered, insoluble in benzene, toluene, tetrahydrofuran, dimethyl formamide and carbon tetrachloride in a yield of 92%.

EXAMPLE 10

*Comparative*

Utilizing the procedure of Example 8 except that an equivalent amount of ethallyl o-propylbenzoate is substituted for the vinyl o-toluate, 89 percent of a highly crosslinked polymer, insoluble in benzene, toluene and dimethyl formamide is recovered.

EXAMPLE 11

*Comparative*

Utilizing the procedure of Example 8 except that the monomer charge constitutes 85 parts of isopropenyl m-ethylbenzoate and 15 parts of styrene instead of the vinyl o-toluate. A copolymer is recovered in a yield of 87% which is insoluble in benzene, toluene, dimethylformamide and carbon tetrachloride.

We claim:

1. A method for the production of an organic solvent soluble polymer having a molecular weight of at least about 50,000 of an aromatic ester having the formula

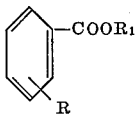

wherein R is a substituent selected from the group consisting of hydrogen and an alkyl radical having from about 1 to 8 carbon atoms, inclusive, and $R_1$ is an aliphatic radical containing one olefinic double bond having from about 2 to 8 carbon atoms, inclusive, which comprises homogenizing a mixture of an anionic emulsifier, water and at least 75%, by weight, based on the weight of the total mixture, of said aromatic ester, to form a stable, homogenized solution thereof, polymerizing the aromatic ester present in the resultant homogenized mixture by contacting said mixture with a slow-reaction catalyst having a half-life of at least about 10 minutes and selected from the group consisting of redox and free-radical generating catalysts, at a temperature of from about 50° C. to about 100° C. and in an inert atmosphere, the amount of water present in said homogenized mixture being such that the mixture contains from about 10% to about 30% solids of the monomer in the homogenized mixture, and recovering the resultant polymer.

2. A method for the production of an organic solvent soluble polymer of vinyl o-toluate having a molecular weight of at least about 50,000 which comprises homogenizing a mixture of said vinyl o-toluate, water, and an anionic emulsifier to form a stable, homogenized solution thereof, the amount of water in said mixture being such that the solids content of the vinyl o-toluate in the solution is from about 10% to about 30%, by weight, polymerizing the resultant homogenized mixture in the presence of a catalyst selected from the group consisting of redox and free-radical generating catalysts having a half-life of at least about 10 minutes at a temperature of between 50° C. and 100° C. and in an inert atmosphere and recovering the resultant polymer of vinyl o-toluate.

3. A method for the production of an organic solvent soluble polymer of vinyl benzoate having a molecular weight of at least about 50,000 which comprises homogenizing a mixture of said vinyl benzoate, water, and an anionic emulsifier to form a stable, homogenized solution thereof, the amount of water in said mixture being such that the solids content of the vinyl benzoate in the solution is from about 10% to about 30%, by weight, polymerizing the resultant homogenized mixture in the presence of a catalyst selected from the group consisting of redox and free-radical generating catalysts having a half-life of at least about 10 minutes at a temperature of between 50° C. and 100° C. and in an inert atmosphere and recovering the resultant polymer of vinyl benzoate.

4. A method according to claim 1 wherein the aromatic ester is present in said mixture together with from about 0% to about 15%, by weight, of a monoethylenically unsaturated monomer copolymerizable therewith.

5. A process according to claim 4 wherein the monoethylenically unsaturated monomer is methylmethacrylate.

References Cited by the Examiner

UNITED STATES PATENTS 2,563,602  8/51  Ham et al. _____ 260—85.7

OTHER REFERENCES

Morrison et al.: J. Polymer Science, volume 36 (1959), pages 267–273.

JOSEPH L. SCHOFER, *Primary Examiner.*

J. R. LIBERMAN, DONALD E. CZAJA, *Examiners.*